United States Patent [19]

Bowers

[11] Patent Number: 4,667,973
[45] Date of Patent: May 26, 1987

[54] TRAINING AND DISPLAY JOG CART

[76] Inventor: I. L. Bowers, 7618 Jellico Ave., Northridge, Calif. 91325

[21] Appl. No.: 317,441

[22] Filed: Nov. 2, 1981

[51] Int. Cl.$^4$ ............................................. B62C 1/08
[52] U.S. Cl. ...................................................... 280/63
[58] Field of Search ..................... 280/63, 68, 70, 72, 280/75, 798; 296/205

[56] References Cited

U.S. PATENT DOCUMENTS

| | | | |
|---|---|---|---|
| D. 152,273 | 1/1949 | Leonard | 280/63 |
| 275,133 | 4/1883 | Burkhead | 280/75 |
| 760,698 | 5/1904 | McPhee | 280/63 |
| 792,508 | 6/1905 | Dunn | 280/63 |
| 836,178 | 11/1906 | Coates | 280/63 |
| 2,228,740 | 1/1941 | Wagner et al. | 280/798 |
| 3,141,681 | 7/1964 | Cedarstrand | 280/63 |
| 3,163,438 | 12/1964 | Bliss | 280/63 |
| 3,271,048 | 9/1966 | Beesley et al. | 280/63 |
| 4,033,598 | 7/1977 | King | 280/63 |
| 4,093,306 | 6/1978 | Zitone | 280/63 |
| 4,095,815 | 6/1978 | Mitchell | 280/63 |

Primary Examiner—David M. Mitchell
Attorney, Agent, or Firm—Michael A. Painter

[57] ABSTRACT

A jog cart used for training and displaying horses. The present invention jog cart employs concentric, double tube construction to reduce the use of multiple stress-bearing couplings. A plurality of base, tubular assemblies are disposed in parallel spaced relation and arranged in a U-shaped configuration, horizontal cross-members being coupled thereto to form the seating compartment of the jog cart. The outer tubular assemblies are deformed and extended from the passenger compartment forwardly to form the braces to which a horse is coupled. The U-shaped configuration of the base and bracket members permits lateral entry at the sides of the jog cart and provide for access to a seat assembly. An axle is coupled to the bottom of the base assembly and parallel guard rails formed of the double wall, tubular sections to prevent inadvertent contact with the wheels as well as providing additional structural stability to the jog cart.

4 Claims, 4 Drawing Figures

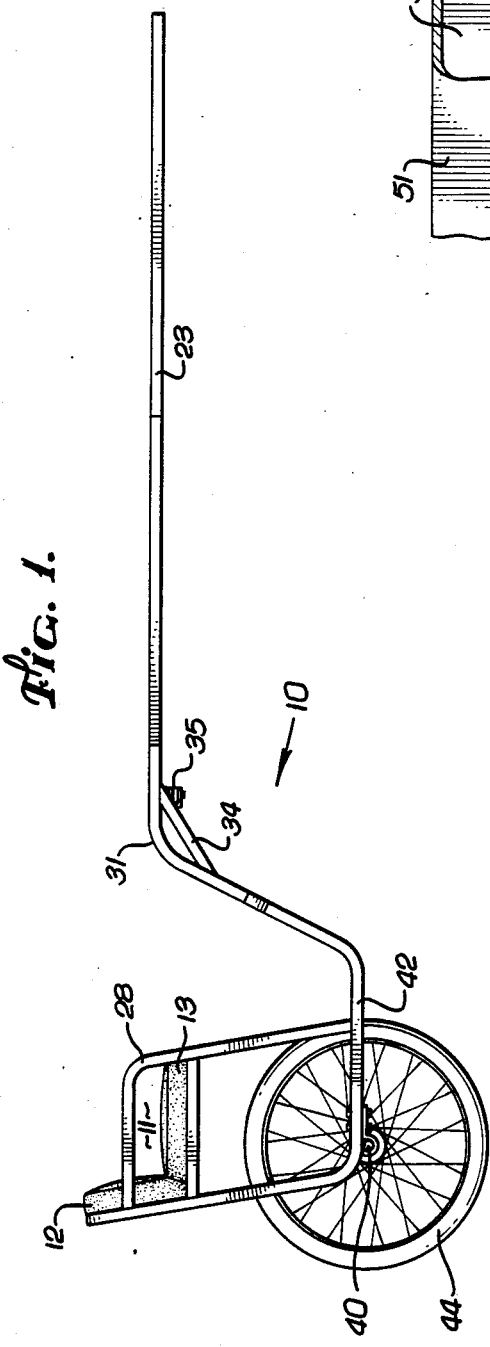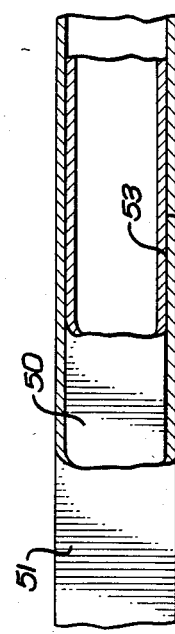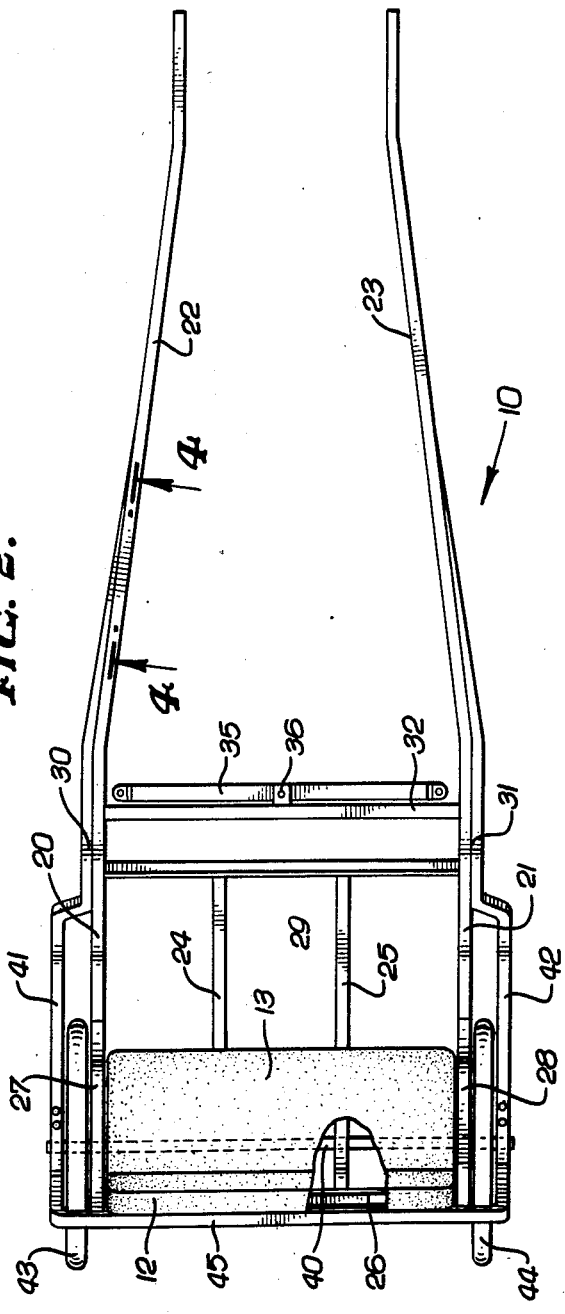

TRAINING AND DISPLAY JOG CART

FIELD OF THE INVENTION

1. Background of the Invention

The present invention generally relates to horse drawn vehicles and, more particularly, to jog carts used for training and displaying horses.

2. Prior Art

The prior art is replete with vehicles which are intended to be drawn by horses. An example of the type of horse drawn vehicle which is illustrated in the prior art is U.S. Pat. No. 760,698 which shows a two-wheeled vehicle which is to be drawn by a horse. Irrespective of the materials used to fabricate the vehicle shown therein, this is precisely the type of vehicle which the present invention is meant to improve upon. The vehicle disclosed has little structural stability which would eliminate the formation stress bearing points such as those formed at bolts or other like connections. In addition, there are no safety features which would prevent inadvertent contact with moving portions of the vehicle.

At the opposite extreme are racing sulkies such as that disclosed in U.S. Pat. No. 4,095,815. This discloses a light-weight racing sulky which includes a horizontal cross-beam member having a pair of shafts affixed thereto and extending forwardly for support by a horse. The seat is fixed to the cross-beam rearwardly thereof and a pair of support leg assemblies pivotally joined to the ends of the cross-beam and adapted to carry wheels at their lower extremities. Adjustable struts connect the lower extremities of the support legs to the shafts at points forward of the wheels. The single seat is adapted to be accessed from the rear of the vehicle. In addition, the subassemblies of the sulky are highly subject to the stress points which would be formed during use.

The present invention substantially solves those problems inherent in the devices taught by the prior art. The present invention is formed with the use of double wall, concentric tube assemblies. The braces to which the horse is coupled are deformed and extended rearwardly to form the base of the jog cart compartment. A plurality of similarly deformed tubular sections are placed in parallel spaced relation to the outer member, and a number of cross-members affixed rearwardly and forwardly of the compartment. The double tube assembly reduces the number of stress-bearing bolts or welds which are necessary to form the seating compartment and also allows the formation of a side entry to the vehicle.

SUMMARY OF THE INVENTION

The present invention generally comprises a jog cart which is used for the display and training of horses. In order to combine both strength and ease of use, the present invention is fabricated of double wall, concentric tubing which can be deformed in a manner which would permit formation of the passenger compartment while reducing the need of many stress-bearing bolts. A pair of braces to which the horse is to be coupled are extended rearwardly and deformed to create the exterior wall of the passenger compartment. The deformation is generally in the form of a U-shaped construction A plurality of U-shaped members are spaced intermediate the outer sections formed from the brace sections and placed in parallel spaced relationship thereto. Horizontal cross-members are coupled both rearwardly and forwardly of the seating compartment forming an opening for ingress into and egress from the passenger compartment. An axle is coupled to the bottom of the passenger compartment and the pair of wheels journeled thereto by appropriate bearing assemblies. An additional double-wall tubular assembly is disposed along the exterior of each of the wheels and coupled to the extensions of the braces.

It is therefore an object of the present invention to provide an improved construction for a jog cart used for training and displaying horses.

It is another object of the present invention to provide a training and display jog cart which permits lateral ingress and egress.

It is still another object of the present invention to provide a training and display jog cart with a minimal number of stress-bearing couplings.

It is still yet another object of the present invention to provide a training and display jog cart which is simple and inexpensive to fabricate.

It is another object of the present invention to provide an increased margin of safety for driver and horse.

The novel features which are believed to be characteristic of the invention, both as to its organization and method of operation, together with further objectives and advantages thereof will be better understood from the following description considered in connection with the drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a side elevation view of a training and display jog cart in accordance with the present invention.

FIG. 2 is a top plan view of the training and display jog cart shown in FIG. 1.

FIG. 4 is a cross-sectional view of the structural members of the present invention training and display jog cart taken through line 4—4 of FIG. 2.

DESCRIPTION OF THE PRESENTLY PREFERRED EMBODIMENT

Figure 3:
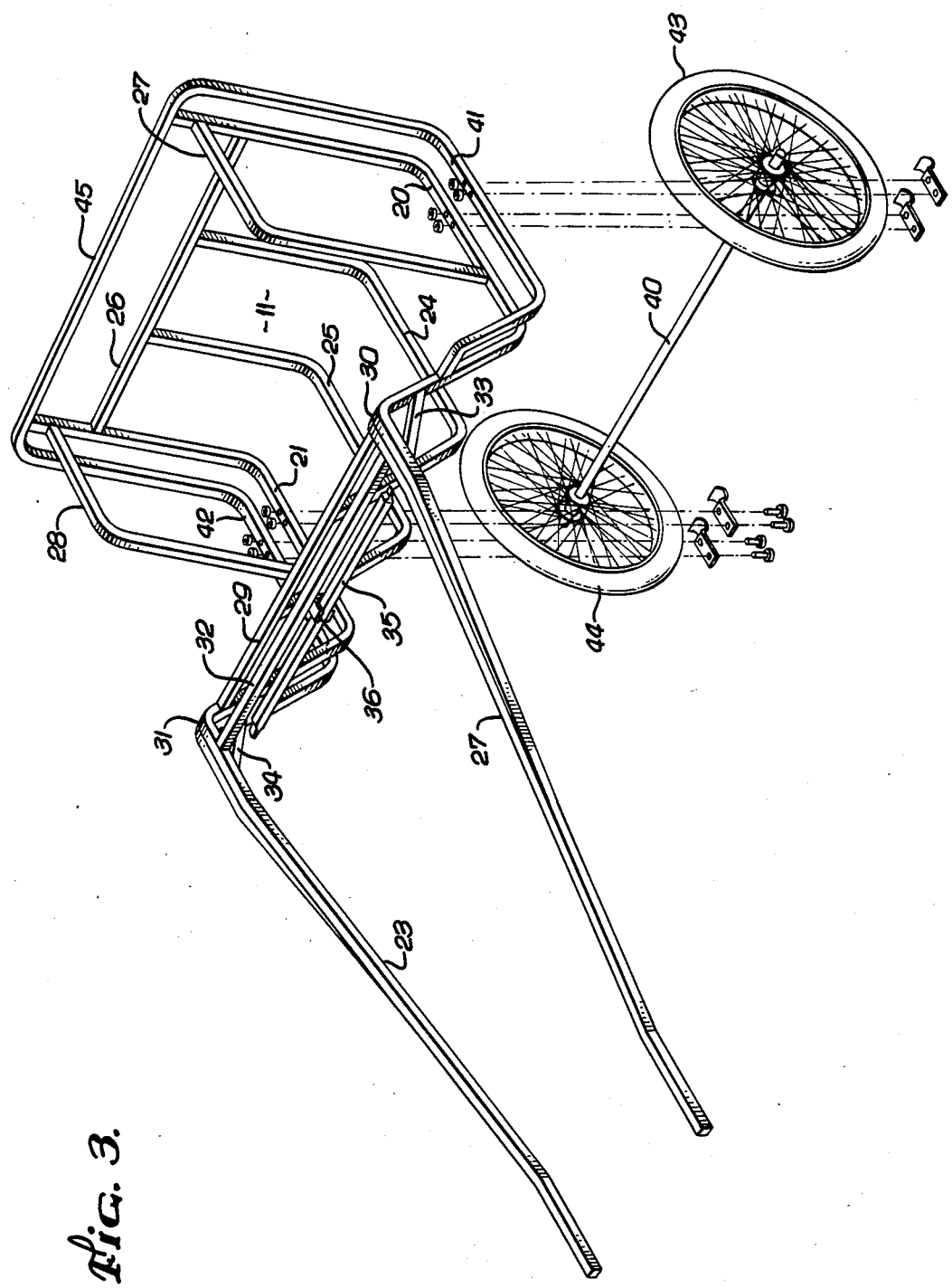
FIG. 3 is an assembly view of a training and display cart in accordance with the present invention.

An understanding of the present invention can be best gained by reference to FIGS. 1 and 2 wherein side elevation and partial top plan views of the present invention training and display jog cart can be best seen, the jog cart being generally designated by the reference numeral 10. The training and display of horses through the use of a jog cart has often required that an individual walk along side of the horse to the rear thereof while primary lines are controlled by the trainer seated on the regulation seat of the jog cart. The present invention jog cart 10 provides for accessibility by two individuals in a manner which would avoid any danger to the individual who is aiding the trainer. Referring now to FIGS. 1 and 2, the seating compartment 11 of jog cart 10 is produced by mounting seating members 12 and 13 of the compartment frame in a manner which will be described. As stated previously, the primary objectives of the present invention are to provide for lateral access to the seating compartment 11 while reducing the number of stress-bearing bolts which are normally associated with such construction.

Referring to FIG. 2 and FIG. 3, primary lateral members 20 and 21 extend from the rear portion of the seating compartment 11 and are extended to the converging braces 22 and 23 respectively between which a horse is harnessed. Secondary lateral members 24 and 25 are disposed in parallel spaced relationship and intermediate primary members 20 and 21. As will be described in greater detail hereinbelow, all structural members of the present invention jog cart 10 are fabricated of double wall, concentric tubular steel to increase the strength and safety of the job cart while reducing the number of stress-bearing points which would be incident to member interconnection.

Rear cross-member 26 is secured intermediate primary lateral members 20 and 21 as well as to the termini of secondary lateral members 24 and 25. Side rails 27 and 28 are deformed into a substantially inverted L-shaped section and mounted to primary lateral members 20 and 21 respectively at a point vertically above the connection to rear cross-member 26 and to a second location along the horizontal portion of primary lateral members 20 and 21 respectively to form the opening for lateral ingress and egress to seating compartment 11. A primary structural member is frontal cross-member 29 which is secured intermediate primary lateral memgers 20 and 21 and the front termini of secondary lateral members 24 and 25. The connection of frontal cross-member 29 is substantially identical to that of rear cross-member 26.

As stated, the use of the double wall, concentric tubular memers permit deformation of the structural members thereby eliminating many interconnections which would require welds and/or bolts. As can be seen from FIG. 3, seating compartment 11 is generally formed by deforming primrary and secondary lateral members 24, 25, 27 and 28 into U-shaped configurations. Primary lateral members 20 and 21 are extended into braces 22 and 23 respectively by deforming members 20 and 21 into elbow bends 30 and 31 respectively. It can therefore be seen that there is total integrity of the structure from the forward terminus of braces 22 and 23 to the rear of seating comparment 11. The forward section of seating comparment 11 utilizes cross-member 32 and bracing flanges 33 and 34. The direct connection between the horse and jog cart 10 is at directional member 35 which pivots about its center axis 36.

Axle 40 is secured to the lower surfaces of primary lateral members 20 and 21 as well as the laterally disposed guard rails 41 and 42. Wheels 43 and 44 are journeled at transverse ends of axle 40 by suitable bearings. Guard rails 41 and 42 provide a dual purpose. As can be best seen in FIGURE 3, guard rails 41 and 42 are integral at the rear of seating compartment 11 and are joined at cross-member 45. Cross-member 45 is integral with guard rail 42 at the rearward terminus of primary lateral member 20, cross-member 45 being integral with guard rail 42 at the rearward terminus of primary lateral member 21. Either by the deformation of the annular tubular members forming guard rail 41 and 42 as well as cross-member 45, or through the use of suitable welding, guard rails 41 and 42 are disposed adjacent braces 22 and 23 respectively. The joinder of braces 22 and 23 with guard rails 41 and 42 respectively create a fully integrated structure which is stregthened by the concentric nature of the members themselves. As can be seen in FIG. 2, guard rails 41 and 42 serve the dual purpose of preventing inadvertent contact with the exterior of wheels 43 and 44 respectively.

The ability to reduce the number of stress-bearing bolts which would ordinarily be incident to the training and display jog carts in a manner which is represented by the present invention can be best understood by reference to FIG. 4. FIG. 4 represents a partial cross-section of the representative members 20, 21, 24, 25, etc. Each of the structural members of jog cart 10 are fabricated by creating an annular construction of two concentrically disposed tubular members 50 and 51. Although tubular members 50 and 51 could be of any consistent geometric configuration, the present invention has been described utilizing tubular sections having a square cross-section. As can be seen in FIG. 4, tubular member 50 is disposed within tubular member 51, the outer surface 52 of tubular member 50 being substantially adjacent the inner surface of tubular member 51. In this manner, structural members can be constructed by deforming them at such location such as elbows 30 and 31 as opposed to requiring the joinder of adjacent sections by bolts or welds. Since it is an objective of the present invention to reduce the number of stress-bearing points, the use of a double wall construction shown in FIG. 4 facilitates meeting that objective.

It can therefore be seen that the training and display jog cart represented by the present invention 10 provides an improved construction for vehicles to be used in the training and display of horses. Not only can two persons have access to the interior seating compartment 11 of jog cart 10 to eliminate some of the dangers incident to training procedures, but strength and additional safety features are provided in a manner which are not disclosed by the prior art.

I claim:

1. A training and display jog cart comprising:
    (a) first and second laterally spaced, primary members each having integral rearward, bottom and frontal sections said primary members comprising first and second tubular units, each having inner and outer walls, the inner wall of said second unit being substantially adjacent the outer wall of said first unit;
    (b) a plurality of laterally spaced, secondary members having integral rearward, bottom and frontal sections in parallel spaced relation to said primary members, said secondary members being disposed intermediate said primary members, said second members comprising first and second tubular units, each having inner and outer walls, the inner wall of said second unit being substantially adjacent the outer wall of said first unit;
    (c) a rear cross-member secured to the rearward sections of said primary and secondary members;
    (d) a forward cross-member secured to the frontal sections of said primary secondary members;
    (e) first and second braces secured to the frontal sections of said primary members at the intersection with said forward cross-member, said first and second braces being extended forwardly from said forward cross-member and converging toward one another; and
    (f) first and second wheels rotatably coupled to the bottom sections of said primary members.

2. A training and display jog cart as defined in claim 1 including first and second guard rails having integral rearward, bottom and frontal sections, said guard rails being in parallel spaced relation to the rearward, bottom and frontal sections respectively of said first and second primary members, the rearward and frontal sections of said guard rails being joined to the rearward and frontal sections respectively of said primary members on the opposite side thereof from said secondary members, said wheels being partially disposed intermediate the bottom section of said primary members and the guard rails.

3. A training and display jog cart as defined in claim 2 wherein the frontal sections of said guard rails are extended along and adjacent to a portion of said braces.

4. A training and display jog cart as defined in claim 3 wherein said guard rails comprise first and second tubular units, each having inner and outer walls, the inner wall of said second unit being substantially adjacent the outer wall of said first unit.

* * * * *